US011567186B2

(12) United States Patent
Farnham et al.

(10) Patent No.: US 11,567,186 B2
(45) Date of Patent: Jan. 31, 2023

(54) COMPENSATING RADIO TRACKING WITH COMPARISON TO IMAGE BASED TRACKING

(71) Applicant: Kabushiki Kaisha Toshiba, Minato-ku (JP)

(72) Inventors: Timothy David Farnham, Bristol (GB); Aftab Khan, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 937 days.

(21) Appl. No.: 16/358,135

(22) Filed: Mar. 19, 2019

(65) Prior Publication Data
US 2020/0301004 A1    Sep. 24, 2020

(51) Int. Cl.
*G01S 13/58* (2006.01)
*G01S 13/86* (2006.01)
*G06T 7/70* (2017.01)
*G06T 7/50* (2017.01)
*G06T 7/20* (2017.01)

(52) U.S. Cl.
CPC .......... *G01S 13/867* (2013.01); *G01S 13/587* (2013.01); *G06T 7/20* (2013.01); *G06T 7/50* (2017.01); *G06T 7/70* (2017.01)

(58) Field of Classification Search
CPC .... G01S 13/587; G01S 13/867; G01S 13/723; G01S 7/4026; G06T 7/20; G06T 7/50; G06T 7/70; G06T 2200/04; G06T 2207/10028; G06T 2207/20084; G06T 2207/30241; G06T 7/246
See application file for complete search history.

(56) References Cited

U.S. PATENT DOCUMENTS 6,393,294 B1    5/2002  Perez-Breva et al.
6,414,635 B1    7/2002  Stewart et al.
(Continued)

FOREIGN PATENT DOCUMENTS

EP    1 542 492 A1    5/2005
EP    2 249 172 A1    11/2010
(Continued)

OTHER PUBLICATIONS

Liu, T. et al. "A Visual-Based Approach for Indoor Radio Map Construction Using Smartphones" Sensors, vol. 17, No. 8, 2017, 18 Pages.
(Continued)

*Primary Examiner* — Timothy A Brainard
(74) *Attorney, Agent, or Firm* — Oblon, McClelland, Maier & Neustadt, L.L.P.

(57) ABSTRACT

The present disclosure provides an error detector for determining an error vector between a radio trajectory and an image trajectory. The error detector includes: an input for monitoring a radio trajectory of an object from a radio signal and an image trajectory of an object from an image over an observation area; a correlation module arranged to correlate the radio trajectory with the image trajectory; an error module arranged to determine an error vector between the radio trajectory and the image trajectory; and an output arranged to transmit the error vector for use in determining an estimated trajectory of a target based on a target trajectory from a radio signal.

23 Claims, 8 Drawing Sheets

(56) References Cited

U.S. PATENT DOCUMENTS

| | | |
|---|---|---|
| 6,971,063 B1 | 11/2005 | Rappaport et al. |
| 6,992,625 B1 | 1/2006 | Krumm et al. |
| 8,275,544 B1 | 9/2012 | Wells et al. |
| 8,289,390 B2 | 10/2012 | Aggarwal et al. |
| 2010/0130229 A1 | 5/2010 | Sridhara et al. |
| 2010/0285883 A1 | 11/2010 | Zalewski |
| 2011/0059752 A1 | 3/2011 | Garin et al. |
| 2011/0163917 A1 | 7/2011 | Lundgren et al. |
| 2013/0053056 A1 | 2/2013 | Aggarwal et al. |
| 2013/0228620 A1 | 9/2013 | Ahern et al. |
| 2013/0344886 A1 | 12/2013 | Jarvis et al. |
| 2015/0057031 A1 | 2/2015 | Tidd et al. |
| 2015/0063135 A1 | 3/2015 | Park et al. |
| 2015/0119076 A1 | 4/2015 | Cohen |
| 2015/0312774 A1 | 10/2015 | Lau |
| 2015/0382153 A1 | 12/2015 | Otis et al. |
| 2016/0127931 A1 | 5/2016 | Baxley et al. |
| 2016/0313441 A1* | 10/2016 | Tuxen ............... G01S 13/72 |
| 2016/0320476 A1* | 11/2016 | Johnson ............ G01S 13/867 |

FOREIGN PATENT DOCUMENTS

| | | | |
|---|---|---|---|
| EP | 2 293 104 A2 | 3/2011 | |
| JP | 2002-291021 A | 10/2002 | |
| JP | 2003-279362 A | 10/2003 | |
| JP | 2006-333068 A | 12/2006 | |
| JP | 2009-109241 A | 5/2009 | |
| JP | 2011-99753 A | 5/2011 | |
| JP | 6041944 B1 | 11/2016 | |
| WO | WO-2018222904 A1 * | 12/2018 | ............ G06N 3/04 |
| WO | WO-2020143916 A1 * | 7/2020 | ......... G06K 9/00805 |

OTHER PUBLICATIONS

Marais, J. et al. "Toward accurate localization in guided transport: combining GNSS data and imaging information" Transportation research Part C: Emerging technologies, vol. 43, 2014, pp. 188-197.

Ramachandran, A. et al. "Spatial Diversity in Signal Strength based WLAN Location Determination Systems" 32nd IEEE Conference on Local Computer Networks (LCN 2007), 2007, 9 Pages.

Ramachandran, A. et al. "Use of Frequency Diversity in Signal Strength based WLAN Location Determination Systems" 32nd IEEE Conference on Local Computer Networks (LCN 2007), 2007, pp. 117-124.

Lee, J.X. et al. "A Scheme to Compensate Time Drift in Time Difference of Arrival Localization Among Non-Synchronized Sensor Nodes" VTC Spring 2009—IEEE 69th Vehicular Technology Conference, 2009, pp. 1-4.

Youssef, M. et al. "Small-Scale Compensation for WLAN Location Determination Systems" 2003 IEEE Wireless Communications and Networking (WCNC 2003), 2003, vol. 3, 6 Pages.

* cited by examiner

COMPENSATING RADIO TRACKING WITH COMPARISON TO IMAGE BASED TRACKING

FIELD

Embodiments described herein relate generally to radio tracking of target objects in an observation area.

BACKGROUND

It is possible to track a target (i.e. a target object) using radio tracking. Radio tracking involves receiving one or more radio signals from observation area and identifying the target from the radio signals. In this way, the position of the target can be determined directly from the radio signal.

Such tracking of targets is not ideal for various reasons. For instance, radio signal techniques may be found to be inaccurate depending on the layout of the observation area. For example obfuscations may exist or areas of high reflection within the observation area. In addition, in an instance where a plurality radio signals exist at the same time and frequency it may not be possible to resolve the signals corresponding to each target, especially where some signals interfere (that is overlap in time and frequency).

Arrangements of the embodiments will be understood and appreciated more fully from the following detailed description, made by way of example only and taken in conjunction with drawings in which.

DETAILED DESCRIPTION

According to an embodiment, there is provided an error detector for determining an error vector between a radio trajectory and an image trajectory, the error detector including: an input for monitoring a radio trajectory of an object from a radio signal and an image trajectory of an object from an image over an observation area; a correlation module arranged to correlate the radio trajectory with the image trajectory; and an error module arranged to determine an error vector between the radio trajectory and the image trajectory; and an output arranged to transmit the error vector for use in determining an estimated trajectory of a target based on a target trajectory from a radio signal. The foregoing trajectories are defined below. Both the radio trajectory and image trajectory may suffer from inaccuracies in certain circumstances. The inaccuracies relating to radio tracking are indicated above. The inaccuracies relating to image tracking include difficulty in identifying an object when other objects exist in the observation area that have a similar shape or form. Using both to determine the error vector allows for ultimate determination of the estimated trajectory to be compensated to accommodate such inaccuracies.

The input may be arranged to determine the radio trajectory by at least one of angle of arrival measurement or time of arrival measurement.

The input may be arranged to determine the image trajectory based on image depth analysis.

The error module may be arranged to determine a spatial error array by spatially interpolating the error vector over the entire observation area.

According to an embodiment, there is provided a trainer for training a machine learning algorithm to generate an estimated trajectory of a target based on a target trajectory, the trainer including: an input for monitoring a radio trajectory of an object from a radio signal and an image trajectory of an object from an image over an observation area; a correlation module arranged to correlate the radio trajectory with the image trajectory; a training module arranged to train a machine learning algorithm based on the radio trajectory and the image trajectory; and an output arranged to transmit the trained machine learning algorithm for use in determining an estimated trajectory of a target based on radio signal measurements. Benefits associated with the trainer are substantially the same as those associated with the error detector. Additionally, the machine learning module, when trained, allows radio signal measurements as an input without the need to derive a target trajectory as used with the error vector.

The input may be arranged to determine the radio trajectory by at least one of angle of arrival measurement or time of arrival measurement.

The train input may be arranged to determine the image trajectory based on image depth analysis.

The machine learning algorithm may comprise a support vector machine or a neural network.

According to an embodiment, there is provided a trajectory estimator for determining an estimated trajectory of a target from a radio signal, the trajectory estimator comprising: an input for monitoring a target trajectory of a target from a radio signal over an observation area; an estimation module arranged to determine an estimated trajectory of the target by correcting the target trajectory from the radio signal using the error vector from the error detector describes above; and an output arranged to transmit the estimated trajectory of the target to a consumer.

The input may be arranged to monitor the target trajectory by at least one of angle of arrival measurement or time of arrival measurement.

According to an embodiment, there is provided a trajectory estimator for determining an estimated trajectory of a target from radio signal measurements, the trajectory estimator comprising: an input for taking radio signal measurements over an observation area; an estimation module arranged to apply the radio signal measurements to the machine learning algorithm described above to obtain the estimated trajectory of the target; and an output arranged to transmit the estimated trajectory of the target to a consumer.

The input may be arranged to take the radio signal measurements by angle of arrival measurement or time of arrival measurement.

According to an embodiment, there is provided a computer-implemented method of determining an error vector between a radio trajectory and an image trajectory, the method including: monitoring a radio trajectory of an object detected from a radio signal and an image trajectory of an object detected from an image over an observation area; correlating the radio trajectory with the image trajectory; determining an error vector between the radio trajectory and the image trajectory; and transmitting the error vector for use in determining an estimated trajectory of a target based on a target trajectory from a radio signal.

The radio trajectory may comprise performing at least one of an angle of arrival measurement or a time of arrival measurement of the training radio signal.

Determining the image trajectory may use image depth analysis.

The method may further comprise determining a spatial error array by populating the error vector over the observation area.

According to an embodiment, there is provided a computer-implemented method for training a machine learning algorithm to generate an estimated trajectory of a target, the method including: monitoring a radio trajectory of an object from a radio signal and an image trajectory of an object from a training image over an observation area; correlating the radio trajectory with the image trajectory; training a machine learning algorithm based on the radio trajectory and the image trajectory; and transmitting the trained machine learning algorithm for use in determining an estimated trajectory of a target based on measured radio signals.

Monitoring the radio trajectory may comprise performing at least one of an angle of arrival measurement or a time of arrival measurement of the training radio signal.

Determining the image trajectory may use image depth analysis.

The machine learning algorithm may comprise a support vector machine or a neural network.

According to an embodiment, there is provided a computer-implemented method of determining an estimated trajectory of a target, the method comprising: monitoring a target trajectory of a target from a radio signal over an observation area; determining an estimated trajectory of the target by correcting the target trajectory from the radio signal using the error vector determined according to the method described above; and transmitting the estimated trajectory to a consumer.

Monitoring the target trajectory may include measuring an angle of arrival measurement or a time of arrival measurement.

According to an embodiment, there is provided a method of determining an estimated trajectory of a target, the method comprising: taking measurements from a radio signal over an observation area; applying the radio signal measurements to the machine learning algorithm trained according to the method described above to obtain the estimated trajectory of the target; and transmitting the estimated trajectory to a consumer.

The radio signal measurements may be taken by an angle of arrival measurement or a time of arrival measurement.

According to an embodiment, there is provided a non-transitory computer readable medium including instructions stored thereon that when executed by a processor, cause the processor to perform the method as described above.

The following description is described with reference to various parameters. For instance, the term "trajectory" is used to denote spatiotemporal movement information of an object over time. Positional information may include Cartesian coordinates with reference to a receiver or global positioning system (GPS) coordinates, for example. The coordinates may be provided in two or three dimensions. The trajectory may refer to a path which the object follows when moving through an observation area and may refer to continuous movement or intermittent movement of the object. The trajectory can be described by the collection of positional coordinates at discrete time intervals.

The following description refers to a "radio trajectory", an "image trajectory", a "target trajectory", and an "estimated trajectory". As will become apparent in the following description, the radio trajectory and the image trajectory refer to trajectories of an object during a training or collection phase and the target trajectory and the estimated trajectory refer to trajectories of an object during an operational phase subsequent to the training or collection phase. The "radio trajectory" may refer to the trajectory of the object derived from positional information provided from one or more radio signals at discrete time intervals. The "image trajectory" may refer to a trajectory of the object derived from positional information provided from an image captured of the observational area. The "target trajectory" may refer to a trajectory of the target object derived from positional information provided from one or more radio signals during the operational phase. The "estimated trajectory" may refer to a trajectory of the target object calculated based on the "target trajectory" modified based on the "radio trajectory" and the "image trajectory".

Figure 1:
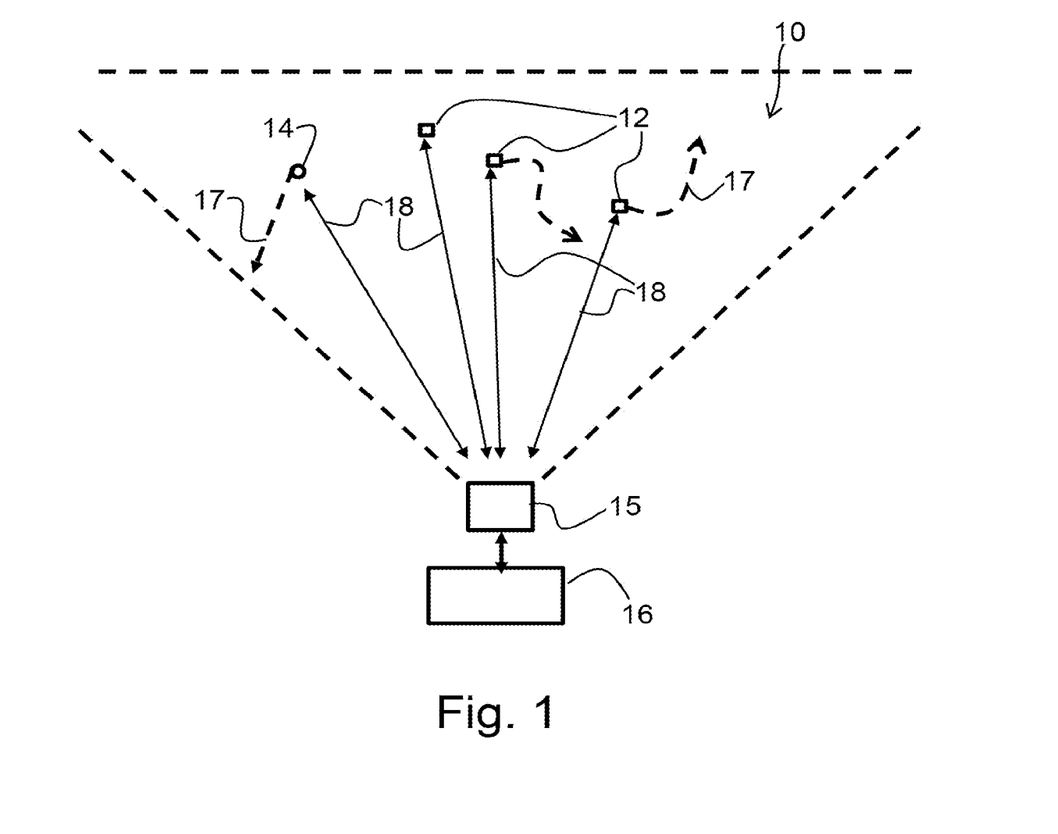
FIG. 1 shows a trajectory mapping system according to certain embodiments for tracking a target in an observation area.

With reference to FIG. 1, an observation area 10 is provided and having a plurality of objects. The objects may include background objects 12 and a target 14 (i.e. a target object). The objects may move over time and follow trajectory 17.

A sensor 15 may be provided to receive the signals 18 from the observation area 10. The sensor 15 may include a receiver which may be in the form of a radar or other means for receiving radio waves. The receiver may be configured to receive various types of radio signals, or radio waves. For instance, the radio signals may be cellular radio signals (3G, 4G, etc.), or Wi-Fi signals. The receiver may be of the form of a radar system.

The sensor 15 may also include an image sensor. The image sensor may be a camera or other image detector able to capture images from the observation area 10. The image sensor and the receiver may be provided in the same location or separately. The image sensor may be a three-dimensional camera upon which depth analysis may be performed of the captured images. The image depth analysis may be used to identify one of the objects from the observation area 10 as a result of contours in the captured image, for example.

A trajectory mapping system 16 may be arranged to monitor the signals 18 received by the sensor 15.

Figure 2:
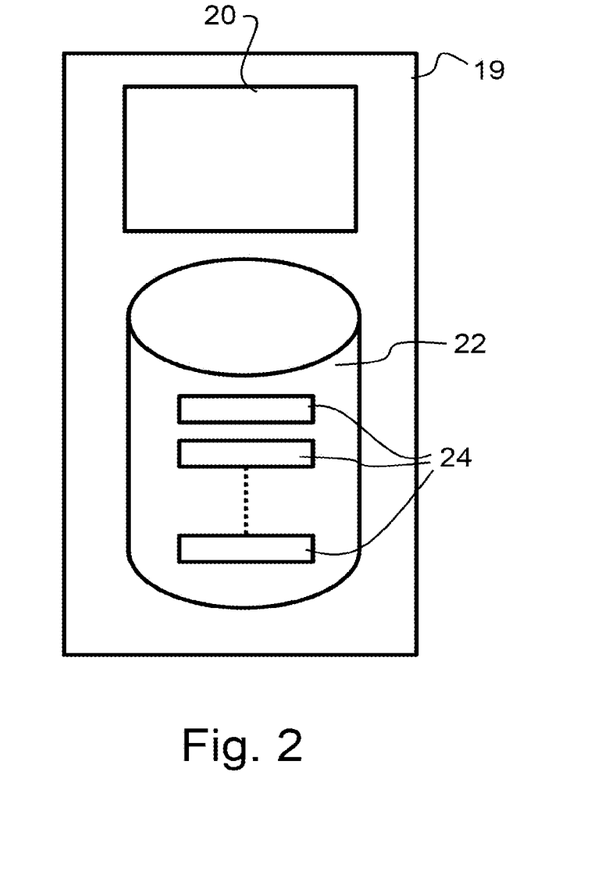
FIG. 2 shows a computer system for embodying the trajectory mapping system from FIG. 1.

With reference to FIG. 2, the trajectory mapping system 16 may be embodied on a computer system 19. The computer system 19 may be in the form of a stationary or portable computer system 19. For instance, a portable computer system 19 may form part of a mobile device, such as a smart phone or tablet computer. The computer system 19 may include a processor 20 and a memory 22. A non-transitory computer readable media may also be provided as part of the memory 22 or may be provided separately. The non-transitory computer readable media may include instructions stored thereon that when executed by the processor 20 cause the processor 20 to perform the method (s) performed by the trajectory mapping system 16 and described below.

The trajectory mapping system 16 may be stored as electronic data in the non-transitory computer readable media in the form of various computer programs 24.

Figure 3:
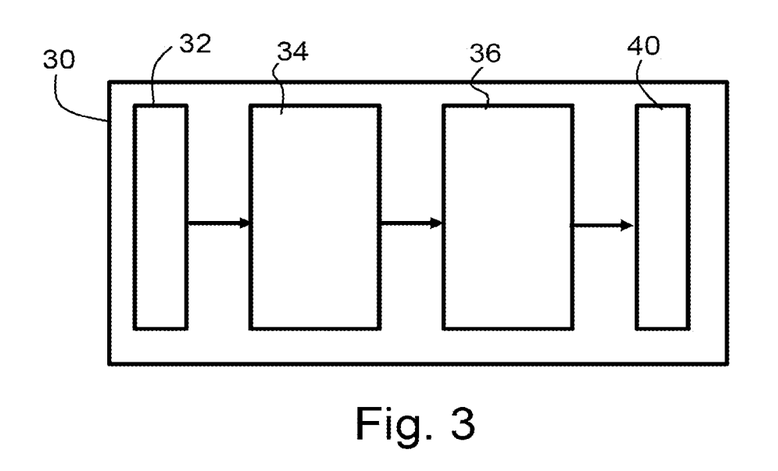
FIG. 3 shows a block diagram of an error detector of the trajectory mapping system from FIG. 1.
Figure 4:
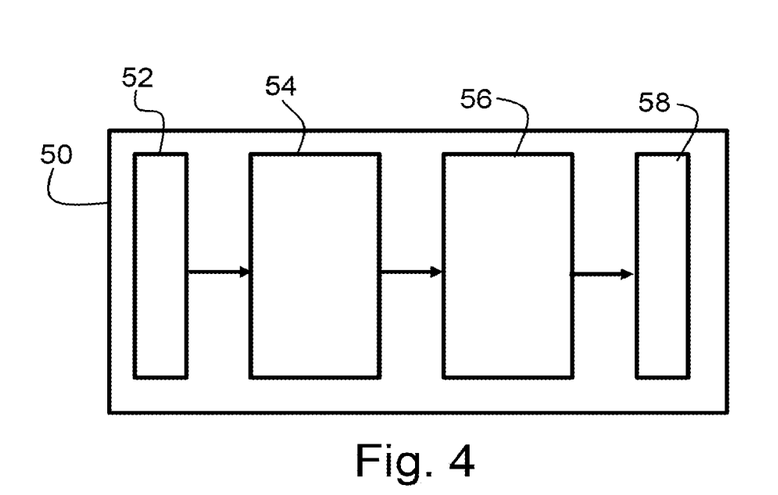
FIG. 4 shows a block diagram of a trainer of the trajectory mapping system from FIG. 1.

With reference to FIGS. 3 and 4, the trajectory mapping system 16 may include an error detector 30 (or trainer 50) and a trajectory estimator 60. The error detector 30 or (trainer 50) may be used primarily in a training or collection phase, and the trajectory estimator 60 may be used primarily in an operational phase.

With specific reference to FIG. 3, the error detector 30 may include an input 32, a correlation module 34, an error module 36, and an output 40.

In some embodiments, the sensor 15 from FIG. 1 may form part of the input 32 may be formed separately. The input 32 is configured to monitor the radio signals and the images captured by the sensor 15. The radio signals in the image signals captured by the input 32 may be captured over a period of time, for instance over the training or collection phase. In this way, the input 32 is arranged to monitor a radio trajectory of an object from the radio signals, and is also arranged to monitor an image trajectory of an object from the images.

For instance, the radio trajectory may be derived by monitoring positional information associated with the captured object from the radio signals. The input 32 may be arranged to monitor the radio trajectory by means of angle of arrival (AOA) or time of arrival (TOA) measurements. Other means may also be provided such as signal strength measurements.

The image trajectory may be derived by monitoring positional information associated with the captured object from the captured images. As described above, the positional information of an object may be identified by monitoring contours within the image, and how the position information changes over time.

The correlation module 34 is arranged to correlate a radio trajectory with an image trajectory to ensure that they are derived from the same object. Radio trajectories and image trajectories do not provide perfectly accurate measurements depending on the conditions. For instance, the radio trajectory may suffer from reflections depending on certain objects being present in the observation area 10. In addition, the image trajectory may suffer from identification fidelity were similar objects are close to one another within the observation area. In this case it may be difficult to distinguish between similar objects. Other factors that may affect the fidelity of the trajectories may include objects in the observation area that could obfuscate a monitored object. Accordingly, the positional information in the respective radio and image trajectories may not be identical. Currently it may be necessary to provide a likelihood of whether any detected objects between the respective trajectories correlate. The likelihood may be compared to a threshold where the difference between the positions in the respective trajectories may be considered too great to correspond to the same object, for example.

This can be performed by computing the mean Euclidean distance between discrete points on the corresponding trajectories at discrete intervals. Alternatively, a smoothing can be performed (such as using a Kalman filter or other filters) prior to calculation of the Euclidean distance at discrete points in order to eliminate or reduce the impact of outliers.

The error module 36 is arranged to determine an error vector between the radio trajectory and the image trajectory at discrete spatial points. The error vectors represent the error values in each of the axes between the radio trajectory and the image trajectory at discrete positions over the radio trajectory. In this way, the error vector values may be provided at each discrete point on the image trajectory. The set of error vectors may be built up over time in the form of an array covering substantially all of the observational area, or large portions thereof. In this way, each location point within the observation area may be associated with an error vector value. In certain circumstances, different regions of the observation area 10 will observe different error vectors which can be interpolated to determine the values at positions in which no measurements are available=. This may be because of various factors including obfuscations, reflections, interference, distance from the sensor 15, and noise. Of course, the various factors described are not limiting in the may be additional factors that may also impact the error values at certain locations in the observation area 10.

The output 40 may be arranged to transmit the error vector for use in determining an estimated trajectory from a target trajectory during an operational phase.

As an alternative to the error detector from FIG. 3, FIG. 4 shows a trainer 50. The trainer 50 can be used in place of the error detector 30 from FIG. 3. The trainer 50 includes an input 52, a correlation module 54, a training module 56, and an output 58. The input 52 and the correlation module 54 working substantially the same way as the input 32 and the correlation module 34 from the error detector 30. Accordingly, repeated description is omitted here for brevity.

The training module 56 is arranged to train a machine learning algorithm based on the raw radio signal measurements corresponding to the radio trajectory and the image trajectory, which are used as a ground truth estimate of the target position at discrete time intervals. The error vectors need not be an input to the machine learning algorithm. The machine learning algorithm may be a support vector machine (SVM) or a neural network (NN). The machine learning algorithm may be trained during the training phase. The machine learning algorithm may be used to determine an estimated position vector based on a target position vector or raw radio signal measurements during an operational phase.

The output 58 may be arranged to transmit the machine learning algorithm for use by the trajectory estimator 60 in determining the estimated trajectory based on the target trajectory or raw radio measurements.

Figure 5:
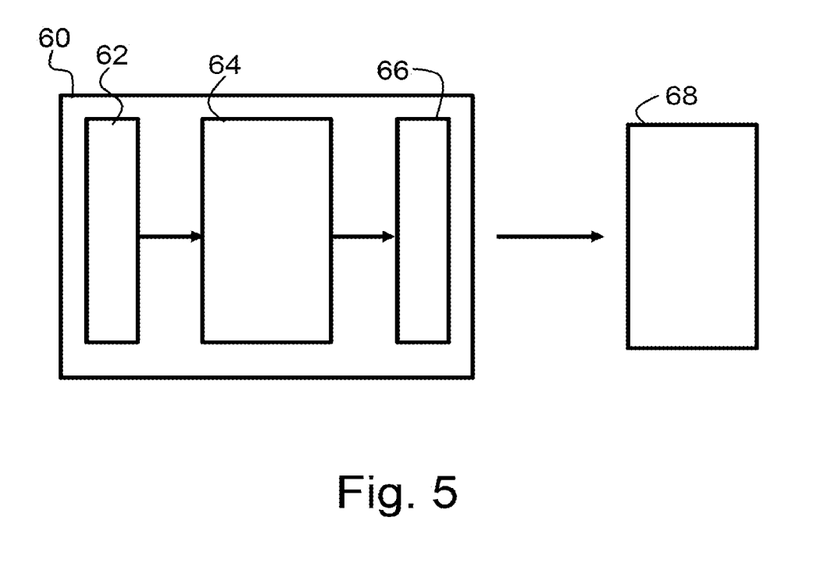
FIG. 5 shows a block diagram of the trajectory estimator of the trajectory mapping system from FIG. 1.

With reference to FIG. 5, the trajectory estimator 60 includes an input 62, an estimation module 64 and an output 66.

The input 62 is arranged to monitor the sensor 15 during the operational phase. In this way, the input 62 is arranged to monitor the target trajectory or raw radio signals received by the sensor 15 from the observation area 10. It should be noted that the input 62 does not need to monitor the image sensor part of sensor 15 since only the target trajectory or raw radio signal measurements are required by the trajectory estimator 60 during the operational phase. It is advantageous to use only the raw radio signal measurements as an input without any input from the image sensor during the operational phase to reduce processing burden as a result of image depth and radio signal analysis requiring much higher processing power and additional complexity compared to just measuring the radio signals.

The estimation module 64 is arranged to determine an estimated trajectory using the target trajectory or raw radio signal measurements as an input. In the event that the estimation module 64 uses the error vectors from the error detector 30 from FIG. 3, the error vector is used to compensate the target trajectory to arrive at the estimated trajectory. In the event that the estimation module 64 uses the machine learning algorithm from the trainer 50 from FIG. 4, the target trajectory or raw radio signal measurements are applied to the machine learning algorithm which generates an estimated trajectory.

The output 66 outputs the estimated trajectory to a consumer 68. The consumer may be part of the same computer system 19 (from FIG. 2), such as a display device, or may be a separate system altogether.

Figure 6:
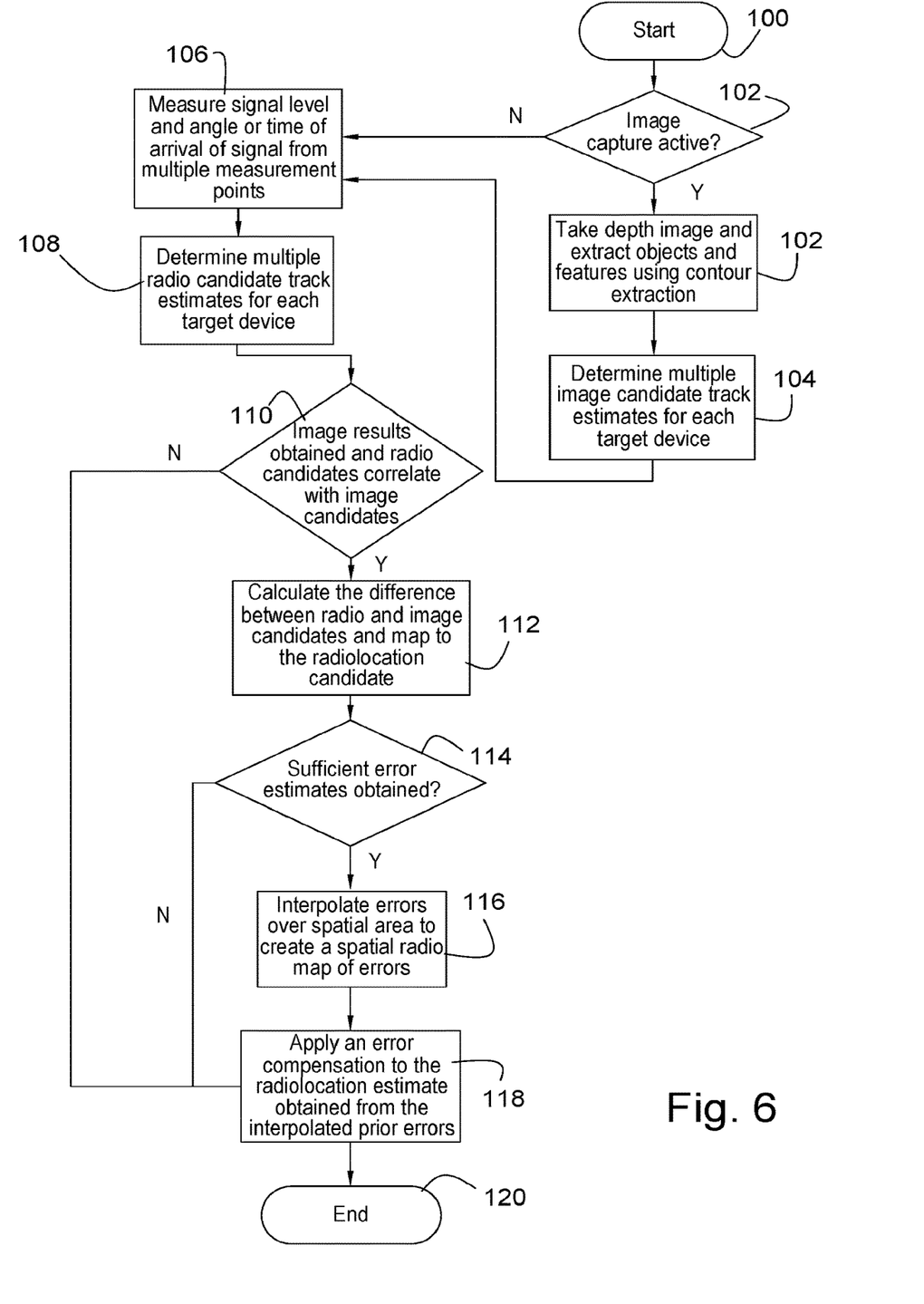
FIG. 6 shows a flow chart of a method according to an embodiment for determining an estimated trajectory of a target.

FIG. 6 provides a flow chart to describe the operation of the trajectory mapping system 16 when using the error detector 30 from FIG. 3 as opposed to the trainer 50 from FIG. 4.

With reference to FIG. 6, at step 100 the process is started. At step 102, a check is initiated to determine whether image capture is active. In other words, a check is made to see whether the input 32 of the error detector 30 is receiving the relevant image object data or whether the image sensor is even turned on.

If the image capture is active, at step 104, the image object data from the image sensor may be observed. In particular, the depth of the image is observed and objects are extracted together with any additional features using contour extraction. Next, at step 106, positional information for any objects 12 within the observation area 10 is determined and an image trajectory is generated for each object 12.

Next, at step 108, the receiver monitors the radio signals. It should be noted that in the event that the image capture is inactive, the process moves directly from step 102 to 108.

Next, at step 110, a radio trajectory is determined for any objects detected by the radio signals. Next, at step 112, the image trajectories and the radio trajectories are compared and a correlation is made between any trajectories that are considered to be associated with the same object. The correlation may be made as a result of a likelihood computation. The likelihood computation could utilise the mean Euclidean distance measured between discrete points corresponding to time intervals along the trajectories. The time intervals are preferably defined on a fixed periodic basis.

In the event that the correlation is positive, at step 114, and a match between a radio trajectory and an image trajectory is made (such that the mean Euclidian distance is minimised and is also less than a set threshold) the error vectors are formed at discrete intervals over the radio trajectory by the distance in each axis between the discrete points of the radio trajectory and the image trajectory. Note that it is also possible that error vectors are described by the error magnitude and direction if preferred.

Next, at step 116, a check is performed regarding the number of error estimates that have been added to the set error vectors. In the event that a sufficient number of error estimates have been obtained, these error vectors are interpolated over a spatial area of the observation area 10 to create a spatial radio map of error vectors, or an error vector array, over the spatial area. In other words, the error vector array may be considered to include a plurality of error vectors. The spatial area may be the entire observation area 10 or a part thereof. The number of error estimate is considered to be sufficient when above a threshold, for example.

Next, at step 118, the error vector array is applied to a target trajectory to determine an estimated trajectory of the target. Next, at step 120, process is terminated.

As described above, at step 112, the image and radio trajectories are compared. In the alternative event that no correlation is obtained, (such as the mean Euclidean distance between trajectories is greater than a set threshold for instance) the method progresses directly to step 118.

In addition, if the check at step 116 regarding the number of estimates obtained is insufficient, the method progresses directly to step 118.

Figure 7:
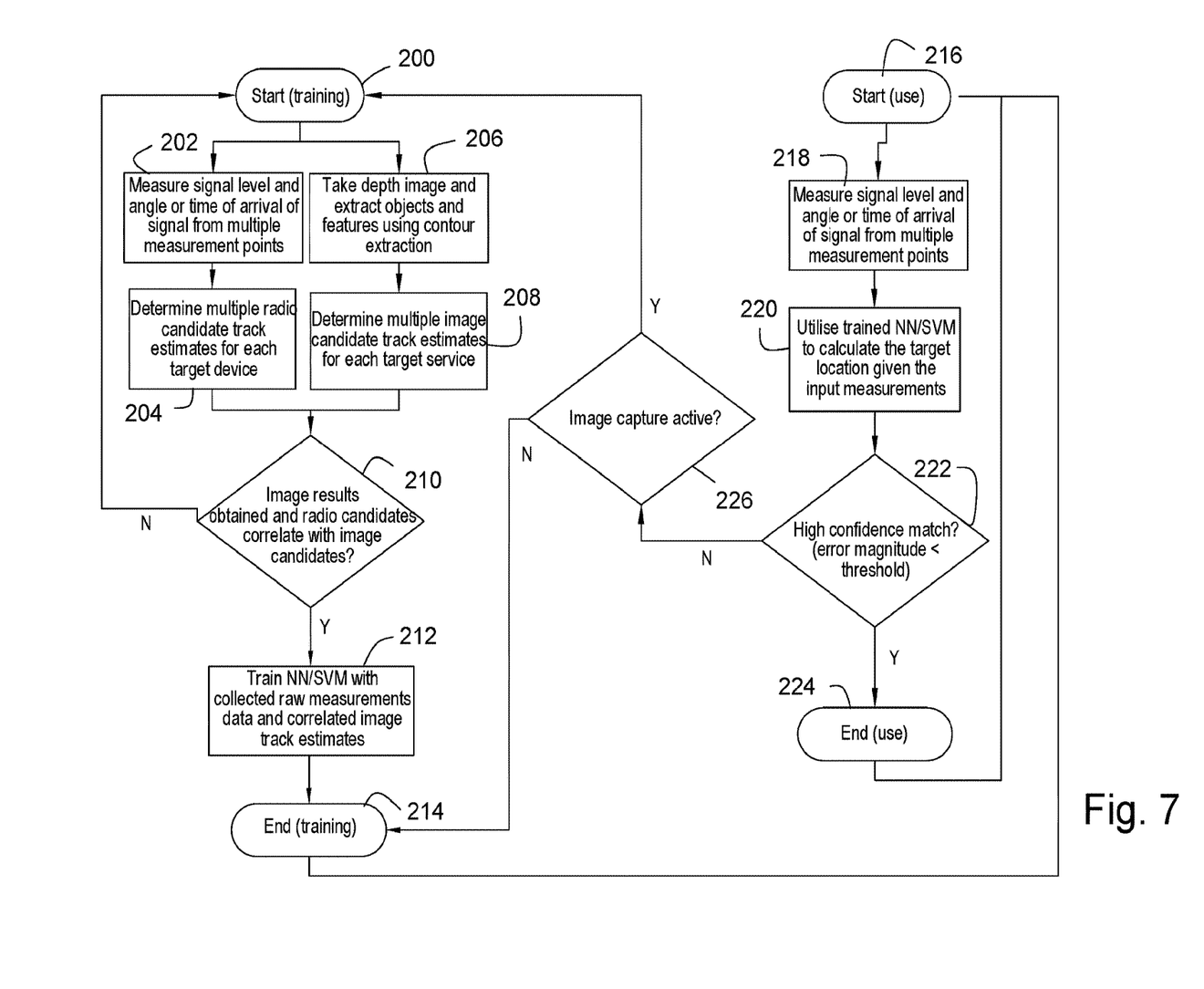
FIG. 7 shows a flow chart of a method according to an embodiment for determining an estimated trajectory of a target.

FIG. 7 shows a method for determining an estimated trajectory from a target trajectory when using the trainer 50 from FIG. 4.

The training phase is started at step 200. At step 202 the radio signals are measured. At step 204, radio trajectories are determined for any detected object in the radio signals. At step 206, images are monitored. At step 208, image trajectories of any objects from the images are determined.

At step 210, a check is performed to see whether any of the radio trajectories and the image trajectories correlate as a result of being derived from the same object in the observation area 10. In the event that no trajectories are positively correlated, the method reverts back to the start of the training phase at step 200.

In the event a positive correlation is identified, at step 212, the machine learning algorithm is trained using the image trajectories and the radio trajectories or raw radio signal measurements. At step 214, the training phase ended.

The operational phase started at step 216. At step 218, the radio signals are measured and optionally used to derive the radio trajectory. At step 220, the radio trajectory or the raw radio signal measurements are applied to the machine learning algorithm which provides the estimated trajectory as a result.

At step 222, a check is made as to whether or not the algorithm is still accurate. In other words, a check may be made to see whether an error magnitude is less than a threshold. In the event that the error or confidence magnitude is less than the threshold, the operational phase ended at step 224.

In the event that the error or confidence magnitude is greater than or equal to the threshold, a check is performed at step 226 as to whether or not image capture is active and detecting image objects. In the event the image capture is not active or not detecting image objects, the process reverts back to the start of the operational phase at step 216 via the end of the training phase at step 214. This loop will continue again until the image capture is active.

In the event that image capture is active, the method proceeds to the start of the training phase at step 200 instead of the end of the training's phase at step 214.

Using the foregoing methods, accuracy in determining an estimated trajectory of a target object is improved since radio signals are enhanced by a correlation between previously obtained radio signals and images since deficiencies in image detection methods and radio detection methods can be compensated.

Figure 8:
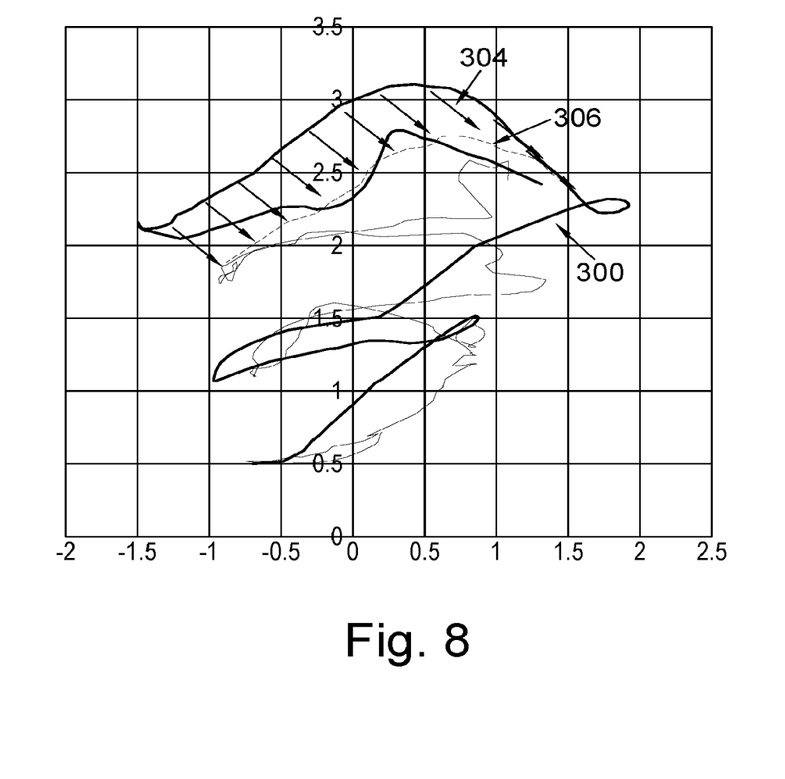
FIG. 8 shows an estimated trajectory determined using the method from FIG. 6 or FIG. 7.

FIG. 8 shows a sample radio trajectory 300 and an image trajectory 302. FIG. 8 also shows the effects of an error vector as reference 304. FIG. 8 also shows an estimated trajectory 306 in the event that the radio trajectory 300 follows the same path as a target trajectory.

Figure 9:
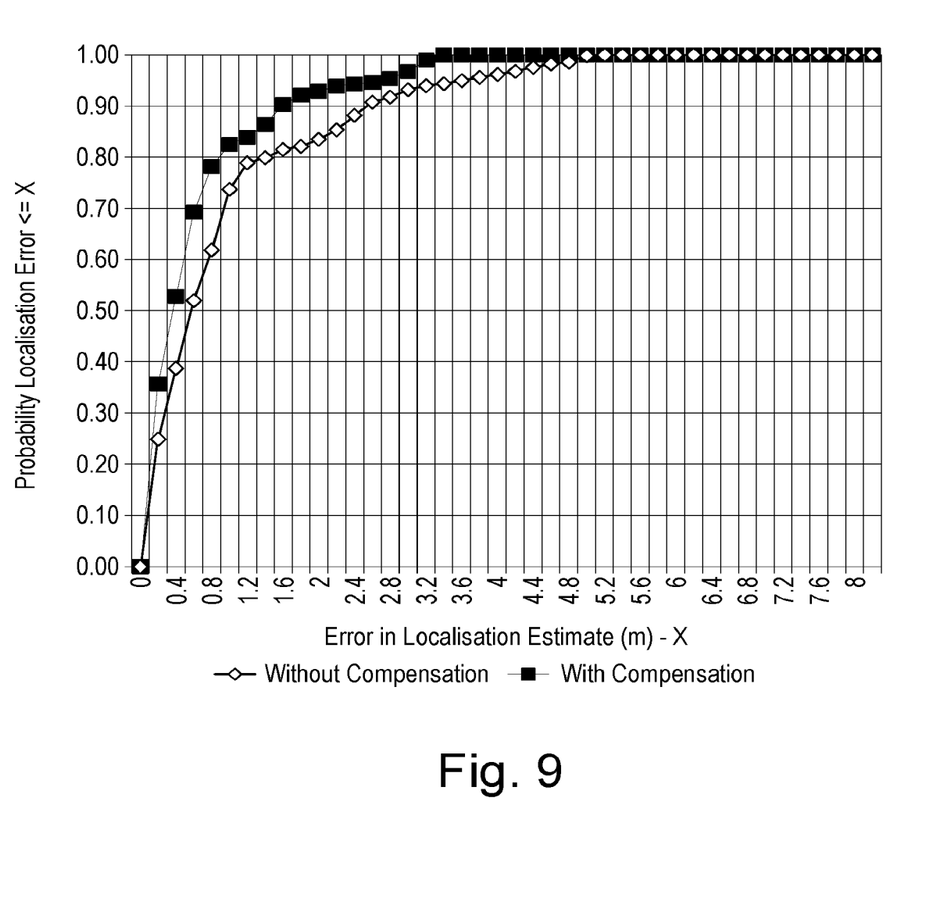
FIG. 9 shows localisation performance results for an estimated and target trajectory (that is with and without using the compensation from the output of the error detector from FIG. 3 or the trainer from FIG. 4).

FIG. 9 shows a performance comparison of compensating the target trajectory versus not compensating the target trajectory. This indicates the Cumulative Distribution Function (CDF) of the performance of the localisation approach before and after applying spatially interpolated error vectors collected from the sample shown in FIG. 8. In the first step spatial error vectors are collected as per the embodiment. In the second step they and interpolated and then applied to subsequent target radio trajectory estimates to provide improved target localisation performance. The localisation error is measured as Euclidean distance in relation to the ground truth or actual target locations.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. An error detector comprising:
    an input for monitoring a radio trajectory of a first object from a first radio signal and an image trajectory of a second object from an image over an observation area;
    a correlation processor configured to correlate the radio trajectory with the image trajectory based on a likelihood value obtained by computing a distance measured between points corresponding to time intervals along the radio trajectory and the image trajectory;
    an error processor configured to determine an error vector between the radio trajectory and the image trajectory; and
    an output configured to transmit the error vector for use in determining an estimated trajectory of a target based on a target trajectory from a second radio signal, the estimated trajectory of the target being determined by correcting the target trajectory from the second radio signal using the error vector.

2. The error detector of claim 1, wherein the input is configured to determine the radio trajectory by at least one of angle of arrival measurement or time of arrival measurement.

3. The error detector of claim 1, wherein the input is configured to determine the image trajectory based on image depth analysis.

4. The error detector of claim 1, wherein the error processor is configured to determine a spatial error array by spatially interpolating the error vector over an entirety of the observation area.

5. The error detector of claim 1, wherein the error vector is formed of values measured between points corresponding to discrete intervals along the radio trajectory and the image trajectory.

6. A trainer comprising:
    an input for monitoring a radio trajectory of a first object from a first radio signal and an image trajectory of a second object from an image over an observation area;
    a correlation processor configured to correlate the radio trajectory with the image trajectory based on a likelihood value obtained by computing a distance measured between points corresponding to time intervals along the radio trajectory and the image trajectory;
    a training processor configured to train a machine learning algorithm based on the radio trajectory and the image trajectory; and
    an output configured to transmit the trained machine learning algorithm for use in determining an estimated trajectory of a target based on a second radio signal measurements, the second radio signal measurements being applied to the machine learning algorithm to obtain the estimated trajectory of the target.

7. The trainer of claim 6, wherein the input is configured to determine the radio trajectory by at least one of angle of arrival measurement or time of arrival measurement.

8. The trainer of claim 7, wherein the input is configured to determine the image trajectory based on image depth analysis.

9. The trainer of claim 7, wherein the machine learning algorithm comprises a support vector machine or a neural network.

10. A trajectory estimator comprising:
    a first input for monitoring a radio trajectory of a first object from a first radio signal and an image trajectory of a second object from an image over an observation area;
    a correlation processor configured to correlate the radio trajectory with the image trajectory based on a likelihood value obtained by computing a distance measured between points corresponding to time intervals along the radio trajectory and the image trajectory;
    an error processor configured to determine an error vector between the radio trajectory and the image trajectory;
    a second input for monitoring a target trajectory of a target from a second radio signal over the observation area;
    an estimation processor configured to determine an estimated trajectory of the target by correcting the target trajectory from the second radio signal using the error vector; and
    an output configured to transmit the estimated trajectory of the target to a consumer.

11. The trajectory estimator of claim 10, wherein the second input is configured to monitor the target trajectory by at least one of angle of arrival measurement or time of arrival measurement.

12. A trajectory estimator comprising:
    a first input for monitoring a radio trajectory of a first object from a first radio signal and an image trajectory of a second object from an image over an observation area;
    a correlation processor configured to correlate the radio trajectory with the image trajectory based on a likelihood value obtained by computing a distance measured between points corresponding to time intervals along the radio trajectory and the image trajectory;
    a training processor configured to train a machine learning algorithm based on the radio trajectory and the image trajectory for use in determining an estimated trajectory of a target based on measured radio signals;
    a second input for taking a second radio signal measurements over the observation area;
    an estimation processor configured to apply the second radio signal measurements to the machine learning algorithm to obtain the estimated trajectory of the target; and
    an output configured to transmit the estimated trajectory of the target to a consumer.

13. The trajectory estimator of claim 12, wherein the second input is configured to take the second radio signal measurements by angle of arrival measurement or time of arrival measurement.

14. A computer-implemented method comprising:
    monitoring a radio trajectory of a first object detected from a first radio signal and an image trajectory of a second object detected from an image over an observation area;
    correlating the radio trajectory with the image trajectory based on a likelihood value obtained by computing a distance measured between points corresponding to time intervals along the radio trajectory and the image trajectory;

determining an error vector between the radio trajectory and the image trajectory; and transmitting the error vector for use in determining an estimated trajectory of a target based on a target trajectory from a second radio signal, the estimated trajectory of the target being determined by correcting the target trajectory from the second radio signal using the error vector.

15. The method of claim 14, further comprising determining a spatial error array by populating the error vector over the observation area.

16. A non-transitory computer readable medium including instructions stored thereon that when executed by a processor, cause the processor to perform the method of claim 14.

17. A computer-implemented method comprising:
monitoring a radio trajectory of a first object from a first radio signal and an image trajectory of a second object from a training image over an observation area;

correlating the radio trajectory with the image trajectory based on a likelihood value obtained by computing a distance measured between points corresponding to time intervals along the radio trajectory and the image trajectory;

training a machine learning algorithm based on the radio trajectory and the image trajectory; and transmitting the trained machine learning algorithm for use in determining an estimated trajectory of a target based on a second radio signal measurements, the second radio signal measurements being applied to the machine learning algorithm to obtain the estimated trajectory of the target.

18. The method of claim 17, wherein the machine learning algorithm comprises a support vector machine or a neural network.

19. A non-transitory computer readable medium including instructions stored thereon that when executed by a processor, cause the processor to perform the method of claim 17.

20. A computer-implemented method comprising:
monitoring a radio trajectory of a first object detected from a first radio signal and an image trajectory of a second object detected from an image over an observation area;

correlating the radio trajectory with the image trajectory based on a likelihood value obtained by computing a distance measured between points corresponding to time intervals along the radio trajectory and the image trajectory;

determining an error vector between the radio trajectory and the image trajectory;

monitoring a target trajectory of a target from a second radio signal over the observation area;

determining an estimated trajectory of the target by correcting the target trajectory from the second radio signal using the error vector; and transmitting the estimated trajectory to a consumer.

21. A non-transitory computer readable medium including instructions stored thereon that when executed by a processor, cause the processor to perform the method of claim 20.

22. A computer-implemented method comprising:
monitoring a radio trajectory of a first object from a first radio signal and an image trajectory of a second object from a training image over an observation area;

correlating the radio trajectory with the image trajectory based on a likelihood value obtained by computing a distance measured between points corresponding to time intervals along the radio trajectory and the image trajectory;

training a machine learning algorithm based on the radio trajectory and the image trajectory for use in determining an estimated trajectory of a target based on measured radio signals;

taking measurements from a second radio signal over the observation area;

applying the second radio signal measurements to the machine learning algorithm to obtain the estimated trajectory of the target; and transmitting the estimated trajectory to a consumer.

23. A non-transitory computer readable medium including instructions stored thereon that when executed by a processor, cause the processor to perform the method of claim 22.

* * * * *